United States Patent [19]

Jarowenko et al.

[11] 4,029,544
[45] June 14, 1977

[54] METHOD OF MAKING A NOVEL STARCH DERIVATIVE AND THE PRODUCT PRODUCED THEREBY

[75] Inventors: Wadym Jarowenko, Plainfield; Henry R. Hernandez, Somerville, both of N.J.

[73] Assignee: National Starch and Chemical Corporation, Bridgewater, N.J.

[22] Filed: July 12, 1976

[21] Appl. No.: 704,528

Related U.S. Application Data

[63] Continuation-in-part of Ser. No. 517,450, Oct. 24, 1974, abandoned.

[52] U.S. Cl. .................................. 162/175; 536/48; 536/49; 536/107; 536/108
[51] Int. Cl.$^2$ ........................................ D21H 3/28
[58] Field of Search ......... 162/175, 181 A; 536/49, 536/108, 109, 54, 48, 107

[56] References Cited

UNITED STATES PATENTS

| | | | |
|---|---|---|---|
| 2,461,139 | 2/1949 | Caldwell | 260/234 |
| 3,459,632 | 8/1969 | Caldwell et al. | 162/175 |
| 3,467,647 | 9/1969 | Benninga | 162/175 |

*Primary Examiner*—S. Leon Bashore
*Assistant Examiner*—William F. Smith
*Attorney, Agent, or Firm*—James & Franklin

[57] ABSTRACT

The use in the manufacture of paper of additives comprising derivatives of starches having particular levels of water fluidity and which contain controlled proportions of cationogenic or cationic substituent groups as well as sulfo-succinate groups. The resulting paper containing the latter additives is characterized by improved retention of pigments and increased strength.

9 Claims, No Drawings

METHOD OF MAKING A NOVEL STARCH DERIVATIVE AND THE PRODUCT PRODUCED THEREBY

This is a continuation-in-part application of our co-pending application Ser. No. 517,450 filed Oct. 24, 1974, now abandoned.

Our invention relates to a method for making paper, and the improved paper thus obtained. More specifically, it is our object to provide an additive which may be incorporated with the paper stock during the manufacture of paper to thereby improve pigment retention and add greater strength as well as other desirable properties.

Our invention comprises the addition to paper stock of starch products comprising starch derivatives possessing specified levels of water fluidity and containing controlled proportions of cationogenic or cationic substituent groups as well as sulfo-succinate groups.

As used herein, the term "paper" includes sheet-like masses and molded products made from fibrous cellulosic materials, which may be derived from natural sources as well as from synthetics such as polyamides, polyesters and polyacrylic resins, as well as from mineral fibers such as asbestos and glass. Also included are papers made from combinations of cellulosic and synthetic materials. Paperboard is also included within the broad term "paper".

It has been known to add various materials, including starch, to the pulp or stock during the papermaking process, prior to the formation of the sheet. The purpose of such additives has been mainly to promote fiber bonding and to facilitate the formation of stronger paper.

Furthermore, in the case of those papers which contain added pigments, such for example as titanium dioxide, it has been known to add materials to the pulp or stock for the specific purpose of retaining a greater proportion of such pigments in the paper (rather than have them drain off in the water that is removed during the formation of the sheet). Such additives are often referred to as "pigment retention agents".

One of the serious problems heretofore encountered in paper manufacture has been that additives employed for binding and strengthening the paper had insufficient effect in improving pigment retention, or in many cases actually decreasing the amount of pigment retained by the paper. Similarly, those additives which were most effective as pigment retention agents had no effect in strengthening the ultimate paper sheet, or in some cases actually drastically weakened it.

The aminoalkyl starch ethers described in U.S. Pat. No. 2,813,093 and employed in the papermaking process in U.S. Pat. No. 2,935,436 have brought about improvements in both paper strength and pigment retention. However, the search for greater improvements has continued, with the particular objective of providing an additive that would be effective at a low pH range in the presence of aluminum salts, regardless of the hardness of the water which is employed in the pulp and in cooking the starch.

It has been proposed to use starch phosphates as pigment retention agents, and their effectiveness has been noticeable with paper stock containing low to moderate concentrations of alum.

At higher alum concentrations, however, the effectiveness of starch phosphates declines, due to reasons not readily understood. Possibly this is because the phosphate groups function as weak acids, which are incapable of providing desired pigment retention and of increasing paper strength in the presence of alum concentrations greater than 4 percent, by weight, of the dry pulp. Thus, starch phosphates, e.g. di- and trialkyl aminoalkyl starch phosphates, like other anionic starch derivatives of the prior art which are effective at lower concentrations of alum, are inferior at higher alum concentrations when compared to the starch products of this invention.

At low alum concentrations, some pigment retention performance improvements can be obtained by introducing carboxyl groups such as carboxymethyl groups or half ester groups e.g. succinate groups (or maleate groups) in starch amine alkyl ethers or native starches.

However, the search for greater improvements has continued, with the particular objective of providing an additive that would be effective at the higher alum concentrations often found in the paper industry, particularly in connection with the increasing utilization of recycled water.

Thus, it is the prime object of this invention to provide starch products which are useful in the manufacturing of paper having high alum acidity. It is a further object of this invention to provide an additive useful in the manufacturing of paper, which may be added to the pulp or stock at any time during the papermaking process prior to the formation of the sheet, and is capable of improving both the pigment retention and strength of the paper.

Various other objects and advantages of this invention will become apparent from the following description thereof.

SUMMARY OF THE INVENTION

We have now discovered that the addition of a starch derivative, hereinafter described, to the pulp at any stage prior to the formation of the paper sheet, results in a remarkable improvement in pigment retention, together with a concomitant increase in paper strength at alum concentrations above 4 percent, by weight, of the dry pulp.

The additives in our invention are starch derivatives of ungelatinized starch bases having a water fluidity between about 4 and about 40, the starch derivatives containing a controlled amount of cationogenic or cationic aminoalkyl ether groups or quaternary ammonium ether groups together with a controlled amount of sulfo-succinate groups. In addition to the foregoing nitrogen containing cationogenic/cationic groups and sulfo-succinate groups, the additives of our invention may also contain phosphate groups as described hereinafter, hydroxypropyl groups, acetate groups or other substituent groups in amounts permitting granular starch character and solubility.

As the cationogenic or cationic substituent in our starch additive, we prefer a tertiary amine ether or quaternary ammonium ether group. However, other cationogenic or cationic groups are operable, for example, primary and secondary amine groups, sulfonium and phosphonium groups attached by ether or ester linkages.

The preparation of the aminoalkyl ethers of starch, wherein the starch derivative contains tertiary amine groups, is described in U.S. Pat. No. 2,813,093. Similarly, sulfonium and phosphonium derivatives of starch are described in U.S. Pat. Nos. 2,989,520 and 3,077,469 respectively.

It is known that quaternary ammonium groups may be introduced into the starch molecule by suitable treatment of the tertiary aminoalkyl ether of starch, as described, for example, in U.S. Pat. No. 2,813,093 or quaternary groups may be introduced directly into the starch molecule, for example, by treatment with the reaction product of an epihalohydrin and a tertiary amine or tertiary amine salt.

Also, as stated, the starch derivatives, to be suitable as an additive to the paper pulp in the process of our invention, must contain sulfo-succinate ester groups. It should be mentioned that, for the purpose of our invention, the sulfo-succination of the starch, i.e., the chemical introduction of the sulfo-succinate groups to the anhydroglucose units, is to be carried out after the starch has been modified with the nitrogen containing cationogenic or cationic groups and, preferably, after it has been converted.

Various techniques for sulfo-succinating the starch base are well known to those skilled in the art. For example, U.S. Pat. No. 2,825,727 discloses a method for treating ethylenically unsaturated starch derivatives prepared according to the method described in U.S. Pat. Nos. 2,461,139 and 2,668,156 with bisulfite.

DETAILED DESCRIPTION OF THE PREFERRED EMBODIMENTS

The starch bases suitable for the process of our invention must be in the intact granular form and must have or be converted to a water fluidity of at least 4 but no greater than 40. Hence, among the suitable starch bases are included those in their ungelatinized form, which may be derived from any plant source such as corn, rice, tapioca, sago, waxy maize, sorghum, potato, sweet potato, wheat, high amylose corn or the like. The particular starch chosen may be converted to its fluidity or thin-boiling form at any stage prior to sulfo-succination, using any suitable method of degradation such as thermal treatment in the presence of sodium phosphate with an amylase on granular starch, or mild oxidative conversion, or mild acid hydrolysis or controlled enzyme conversion. Therefore, since the necessary conversion of the starch to a water fluidity within the prescribed range may be carried out before or after modification with the cationic groups, the selection of the sequence prior to sulfo-succination is left to the practitioner. We have also found that the phosphate ester groups, such as found in potato starch, or the introduction of such groups into corn starch by heat reacting with phosphate salts make the starch suitable for introduction of the sulfo-succinate groups without converting. The degree of substitution (D.S.) of the phosphate groups may range from 0.003 to 0.01.

The starch derivatives suitable for use in the process of this invention should be substituted with cationogenic/cationic groups to such an extent that their degree of substitution (D.S), i.e. the average number of cationogenic/cationic groups per anhydroglucose unit of the starch molecule, ranges from about 0.005 to 0.20, generally at least 0.01 and preferably from about 0.02 to about 0.04. D.S. ranges above 0.20 produce little if any added benefits and it is then necessary to protect the granule structure of the starch by means known in the art. However, a D.S. of 0.5 or above may be used.

Any of the foregoing types of substituent groups may be utilized separately or in combination with other useful nitrogen containing groups or with sulfonium or phosphonium groups, so long as the total D.S. does not exceed about 0.50.

The quantity of the sulfo-succinate ester groups chemically bound to the starch molecule, and more specifically to the anhydroglucose unit, is important because it affects the pigment retention in presence of alum concentrations higher than about 4%. Although the presence of very small amount of the sulfo-succinate ester groups will demonstrate improvements, e.g. even a D.S. of 0.008 will show some improvements, a D.S. of 0.02 to 0.06 is the preferred range. Substitutions as high as D.S. 0.20 may be used but such higher substitution produce no added benefits over the preferred range and are difficult to manufacture.

Since the purpose of this invention is not a balanced performance at various pHs, but improved performance in the presence of high concentrations of alum, the ratio of the anionic groups to cationogenic or cationic groups is of lesser importance. However, the presence of cationogenic or cationic groups will noticeably improve retention and strength at lower concentrations of alum. As previously mentioned, it is also possible to employ in our process starch derivatives containing other substituent groups beside the required cationogenic/cationic and sulfo-succinate groups.

The technique for phosphorylating a starch base is known to those skilled in the art. Thus, U.S. Pat. Nos. 2,824,870, 2,884,412, and 2,961,440 disclose various phosphorylation techniques consisting, essentially, of heat reacting starch impregnated with a phosphate salt of an alkali metal, within a prescribed pH range. For the purpose of our invention, the phosphorylations are limited to reactions of starch with any phosphorylating agent yielding ortho-phosphate mono-ester groups, i.e. mono-starch phosphates. A representative method useful for carrying out a suitable phosphorylation would be similar to that described in assignee's U.S. Pat. No. 3,459,632.

Obviously, the practitioner will recognize that various other optional cationogenic or cationic substituents may similarly be linked to a common anhydroglucose unit, it being remembered that in carrying out our process, not only is it imperative that the starch base be converted to a water fluidity between 4 and 40 or naturally contain phosphate groups, but the synergistic combination of the aminoalkyl ether or quaternary ammonium groups and the sulfo-succinate groups must be present within the prescribed range.

The herein described starch derivatives are used in their dispersed (cooked) form mainly as beater additives, although their addition may occur at any point in the paper-making process prior to the ultimate conversion of the wet pulp into a dry web or sheet. Thus, for example, they may be added to the pulp while the latter is in the headbox, beater, hydropulper or stock chest.

The pigment retention and strength agents of our invention may be effectively used for addition to pulp prepared from any types of cellulosic fibers, synthetic fibers, or combinations. Among the cellulosic materials which may be used are bleached and unbleached sulfate (kraft), bleached and un-bleached sulfite, bleached and unbleached soda, neutral sulfite, semichemical, chemiground wood, ground wood or any combination of these fibers. Fibers of the viscose rayon or regenerated cellulose type may also be used if desired.

Any desired inert mineral fillers may be added to the pulp which is to be modified with our starch derivatives. Such materials include clay, titanium dioxide, talc, calcium carbonate, calcium sulfate and diatomaceous earths. Rosin or synthetic internal size may also be present, if desired.

With respect to the proportion of the starch derivative to be incorporated with the paper pulp, we have found that this may vary in accordance with the particular pulp involved. In general, we prefer to use about 0.05 to 2.0% of the starch derivative, based on the dry weight of the pulp. Within this preferred range the precise amount which is used will depend upon the type of pulp being used, the specific operating conditions, and the particular end use for which the paper is intended. The use of amounts of starch derivative greater than 2%, on the dry weight of the pulp, is not precluded, but is ordinarily unnecessary in order to achieve the desired improvements. When added in the proper concentrations, our starch derivatives serve to increase pigment retention and paper strength, while providing the finished sheet with improved resistance to folding, picking and scuffing.

The products of our invention by the interaction of the sulfo-succinate cationogenic and cationic groups give a well balanced performance over a wide range of water hardness and alum concentration. They yield performance maxima in terms of pigment retention and paper strength, at high alum concentrations, not heretofore obtainable with starch products containing either cationogenic/cationic or anionic groups alone or combinations thereof as taught by the prior art. This surprising synergistic effect makes our additives significantly superior to prior art products within the wide range of operating conditions existing in the papermaking art utilizing pigment and more than 4 percent (by weight of the dry pulp) of alum.

The following examples will further illustrate the embodiments of this invention. Unless otherwise stated, all parts are by weight.

EXAMPLE I

This example illustrates the preparation of a typical alkylamine, phosphate and sulfo-succinate starch derivative suitable for the practice of this invention.

The method outlined in Example I of assignee's U.S. Pat. No. 3,459,632 was utilized to modify a quantity of granular corn starch with tertiary amine and phosphate groups. The resulting starch derivative had about 0.3 percent, by weight, of nitrogen and, on the same basis, about 0.8 percent of phosphorus. It is to be noted, since the starch base was phosphorylated, i.e., modified with phosphate groups, conversion of the same was not necessary. The D.S. of the phosphate groups was about 0.008.

Part I: To chemically introduce the sulfo-succinates to a portion of the modified starch described above, about 100 parts of said modified starch was suspended in about 125 parts of tap water. The suspension was stirred, and the pH of the resulting slurry was adjusted to and maintained at 7.2 by the addition of dilute sodium hydroxide solution, while one part of maleic anhydride was added in small increments. The mixture was allowed to react, as agitation was continued, over a period of about 1 hour to ensure complete esterification. Thereafter about 6 parts of sodium metabisulfite were slowly added to the reaction vessel. This mixture was then allowed to react, under agitation and at ambient temperature, for about 16 hours. After the reaction was completed, the pH level of the system was adjusted to 5.5 by the addition of hydrochloric acid. The reaction product was then recovered by filtration, washed essentially free of salts with tap water, and dried. The resulting product had a D.S. of about 0.028 with respect to the tertiary amine groups and a D.S. of about 0.01 with respect to the sulfo-succinate groups. A portion of the dried starch product was then used as an additive in the preparation of paper and subsequently tested for its pigment retention properties as set forth below.

Part II: Each of three portions of the starch derivative described above were dispersed by cooking at atmospheric pressure in conventional manner and then added at a concentration of 0.25 percent based on the weight of the dry pulp, to a bleached sulfite pulp which contained a varied amount of paper alum, i.e., aluminum sulfate. The three pulps respectively contained 4.0, 11.0, and 15.0 percent, by weight, of alum, based on the dry pulp. In each case, the pigment retention value of the test paper stock and those of a blank and a control were determined by first preparing paper sheets on the Williams Standard Sheet Mold and then testing for the percent of titanium dioxide ($TiO_2$) retained by the method described in TAPPI Standard T413-ts-66. The blank merely consisted of the papermaking stock without any additive, and said control comprised a commercially available pulp having therein a tertiary amine phosphate starch derivative. The test results are presented below.

| Material Tested | Additive | %$TiO_2$ Retention in presence of following amounts of alum* | | |
|---|---|---|---|---|
| | | 4.0 | 11.0 | 15.0 |
| Test Sample | Tertiary amine phosphate sulfo-succinate starch | 72 | 73 | 72 |
| Blank | none | 43 | 37 | 42 |
| Control | Tertiary amine phosphate | 72 | 56 | 52 |

*Based on the percent, by weight, of the dry pulp, yielding pH values of 6.0, 4.6 and 4.0, respectively.

The data summarized above clearly indicate the improved pigment retention obtained by the use of the described starch products of this invention.

EXAMPLE II

This example further illustrates the increased pigment retention effectiveness of the starch derivatives of this invention, prepared using a relatively greater amount of sulfo-succinate groups.

The steps set forth in Part I of Example I were repeated, except two parts of maleic anhydride were used to esterify the modified corn starch prior to sulfonation. The resulting starch derivative had D.S. values of 0.026 and 0.03 for the tertiary amino groups and sulfo-succinate groups, respectively. When a portion of this starch product was tested in the manner described in Part II of Example I, it displayed pigment retention values comparable to those of the test sample in said example.

EXAMPLE III

This example illustrates the increased pigment retention effectiveness of the starch derivatives of this invention, prepared using a relatively greater amount of succinating agent with a slightly lesser amount of sulfonating agent.

The steps set forth in Part I of Example I were repeated, except a tertiary amino phosphate potato starch was further modified with two parts of maleic anhydride and four parts of sodium metabisulfite. The resulting product had D.S. values of 0.03 and 0.02 for the tertiary amino group and the sulfo-succinate group, respectively. Upon being tested by the method outlined in Part II of Example I, this derivative showed pigment retention values, in the presence of the varied indicated amounts of alum, of 79%, 75%, and 76%, respectively.

EXAMPLE IV

This example illustrates the preparation of a sulfo-succinate derivative of a cyclic tertiary amine starch ether for use as a pigment retention additive for paper-making stock.

To make the additive described above, 100 parts of potato starch were slowly stirred into 125 parts of water, and the formed suspension was reacted with one part of betachloroethyl piperidine HCl in the presence of 0.5 parts of calcium hydroxide over a period of about 16 hours at ambient temperature. The pH of the resulting slurry was then adjusted to 3.0 by the addition of hydrochloric acid. Thereafter, the reaction product was recovered by filtration, washed free of salts, and reacted with two parts of maleic anhydride and four parts of sodium metabisulfite in the manner described in Part I of Example I to form the tertiary amino, sulfo-succinate starch derivative. The respective pigment retention values of this derivative, determined according to the procedure set forth in Part I of Example I, were 80, 76, and 76. The product had D.S. values of 0.01 and 0.02 for the tertiary amino group and the sulfo-succinate group, respectively. These results reflect the ability of a starch derivative, wherein the starch base contains naturally occurring phosphorus, to be used as a paper additive in accordance with this invention. Furthermore, these results illustrate that, when such a starch base is employed, the conversion step prior to sulfo-succination may be omitted.

EXAMPLE V

This example illustrates the preparation of a quaternary ammonium, sulfo-succinate starch derivative which is useful in the practice of this invention.

To make the starch derivative, 100 parts of corn starch were slowly stirred into 130 parts of tap water containing four parts of calcium hydroxide, the corn starch having a water fluidity of about 8. The suspension thus formed was then reacted with three parts of trimethyl-2-hydroxy-3-chloropropyl ammonium chloride under agitation and at ambient temperature over a period of about 16 hours. The pH of the resulting slurry was then adjusted to 3.0 by the addition of hydrochloric acid. Thereafter the reaction product was recovered by filtration, washed essentially free of salts, and then suspended in about 140 parts of water. Two parts of maleic anhydride and five parts of sodium metabisulfite were reacted with the quaternary ammonium starch of the suspension in the manner described in Part I of Example I. This modified starch product had a quaternary ammonium group D.S. of 0.01 and a sulfo-succinate group D.S. of 0.03. Then each of three equal portions of the thusly prepared quaternary ammonium, sulfo-succinate starch derivative were added to a particular slurry of a paper-making pulp which contained a varied amount of alum. The three pulps respectively contained 0, 4.0, and 11.0 percent, by weight, of alum, based on the total weight of the particular mixture. The portions of the starch derivative were each added at a concentration of 0.25 percent, by weight, based on the weight of the dry pulp. The pigment retention value of each of the respective paper stocks obtained from the aforesaid three test pulps and those of a blank and a commercially available control were determined by the method set forth in Part II of Example I. The paper making stock in the case of the blank and the control were similar to those respectively employed in Part II of Example I. Test results were presented below.

| Material Tested | % TiO$_2$ retention in presence of following amounts of alum* | | |
|---|---|---|---|
| | 0 | 4.0 | 11.0 |
| Test sample | 13 | 77 | 73 |
| Blank | 8 | 50 | 45 |
| Control | 41 | 82 | 64 |

*Based on the percent, by weight, of the dry pulp yielding pH values of 7.6, 6.0 and 4.6 respectively.

The results presented above clearly indicate that the quaternary ammonium, sulfo-succinate starch derivatives prepared in accordance with this invention are particularly useful in the manufacturing of paper wherein the paper-making stock contains pulp which has a relatively high alum content.

EXAMPLE VI

This example illustrates the increased pigment retention effectiveness of the starch derivatives of this invention, using an alkylamino phosphate, sulfo-succinate starch derivative of which the starch base has been converted by varied acid treatments.

To make each of four test sample additives, a tertiary amino phosphate corn starch was prepared by the method taught in Example I of assignee's U.S. Pat. No. 3,459,632, converted to WF levels ranging from about 8 to 35 by treatment with a varied amount of hydrochloric acid, and then further modified with sulfo-succinate groups. The acid conversions were carried out at 52.5° C. over a period of about 16 hours. After each reaction was completed, the resulting mixture was neutralized by the addition of dilute NaOH, and the tertiary amino phosphate starch was recovered by filtration and then washed. Thereafter about 150 parts of each product was further modified by treatment with two parts of maleic anhydride and thereafter four parts of sodium metabisulfite. The D.S. values for the tertiary amine group and for the sulfo-succinate group were 0.03 and 0.02, respectively. The pigment retention values for the four test samples and those of the blank and the three controls were determined by the method described in Part II of Example I. The varied amounts of hydrochloric acid used to convert the starch, the varied amounts of alum employed in the pulp, and the test results obtained with the various materials tested are presented in the following table.

| Material Tested | | HCl (parts) | % TiO₂ retention in presence of following amounts of alum* | |
|---|---|---|---|---|
| | | | 4.0 | 11.0 |
| Sample A | Tertiary amine phosphate sulfo-succinate starch | 0.25 | 79 | 75 |
| Sample B | (Same as that used in Sample A) | 0.5 | 81 | 90 |
| Sample C | " | 0.75 | 73 | 75 |
| Sample D | " | 1.0 | 74 | 76 |
| Control No. 1 | Tertiary amine starch | — | 56 | 46 |
| Control No. 2 | Tertiary amine, phosphate starch | — | 79 | 52 |
| Control No. 3 | Tertiary amine, sulfo-succinate of a non-converted starch | — | 60 | 59 |
| Blank | | — | 44 | 45 |

*Based on percent, by weight, of the dry pulp.

The data summarized above clearly indicate that in order to obtain improved pigment retention, in accordance with this invention, it is imperative that the base starch be converted as well as modified with the nitrogen containing groups and the sulfo-succinate groups.

EXAMPLE VII

This example illustrates the usefulness of a starch derivative of this invention wherein the base starch of the derivative has been converted prior to modification. Also, this example further illustrates the crucial nature of the conversion step in the preparation of the paper-making additives of this invention.

A test sample additive was prepared by treating a quantity of corn starch with 0.5% HCl to WF of about 10, then diethylamino ethylating the starch by the method taught in Part A of Example I of assignee's U.S. Pat. No. 3,459,632, and thereafter further modifying the starch with sulfo-succinate groups by the method outlined in Part I of Example I. The resulting starch product had a diethylaminoethyl group D.S. of 0.03 and a sulfo-succinate group D.S. of about 0.02. This test sample additive and four varied controls were added to bleached pulp at concentrations of 0.25% based on the weight of the dry pulp. Pigment retention values were determined for each additive and a blank at varied levels of alum as described in Part II of Example I. The identifications of the controls and their respective descriptions were as follows:

Control No. 1 — Corn starch modified with sulfo-succinate groups (D.S. of about 0.02) by the method set forth in Part I of Example I.

Control No. 2 — Control starch modified with diethylamino ethyl groups (D.S. of about 0.03) by the method set forth in Part A of Example I of assignee's U.S. Pat. No. 3,459,632.

Control No. 3 — Corn starch modified with both diethylamino ethyl groups (D.S. of about 0.03) and sulfo-succinate groups (D.S. of about 0.02) by the respective methods mentioned above.

Control No. 4 — Corn starch which has been acid-converted in the same manner as the starch base of the test sample herein and thereafter modified with diethylamino ethyl groups (D.S. of about 0.03) by the method taught in Part IA of assignee's U.S. Pat. No. 3,459,632.

The results of the pigment retention determinations for the above-described test sample additive, the four control additives, and the blank are presented in the following table.

| Material Tested | % TiO₂ retention in presence of following amounts of alum* | |
|---|---|---|
| | 4.0 | 11.0 |
| Test Sample | 69 | 71 |
| Control No. 1 | 62 | 59 |
| Control No. 2 | 56 | 46 |
| Control No. 3 | 60 | 59 |
| Control No. 4 | 52 | 46 |
| Blank (pulp with no additive | 44 | 40 |

*Based on percent, by weight of the dry pulp.

The data obtained for the test sample and control No. 3 in the above table clearly indicate the outstanding pigment retention performance of the starch derivatives of this invention wherein the starch base is converted prior to being esterified.

EXAMPLE VIII

This example further illustrates the improved pigment retention properties of an aminoalkylate, sulfo-succinate starch derivative of which the starch base has been acid-converted prior to esterification with a varied amount of maleic anhydride.

To make each of three test sample additives, a quantity of tertiary amine corn starch was prepared by the method taught in Example I of assignee's U.S. Pat. No. 3,459,632 and then converted to a WF of about 8 by treatment with 0.5 parts of HCl. The resulting converted starch product was then divided into three equal portions. Each of the portions of the starch product was esterified with a varied amount of maleic anhydride and thereafter sulfonated by reaction with four parts of sodium metabisulfite. The acid conversions were carried out at 52.5° C. over a period of 16 hours. Each of the tertiary amino, sulfo-succinate starch derivatives thus obtained was recovered by filtration, washed, and dried. These test sample additives, two commercially available paper-making starch additives, and a blank were tested for their pigment retention properties by the method described in Part II of Example I. The amount of maleic anhydride used in the preparation of each of the test sample additives and the corresponding tertiary amino group to sulfo-succinate group ratio therein, the descriptions of the two controls, and all test results are presented in the following table.

| Material Tested | Additive | D.S. of sulfo-succinate groups | D.S. of tertiary-amino group | % TiO$_2$ retention in presence of alum* | |
|---|---|---|---|---|---|
| | | | | 4.0 | 11.0 |
| Sample E | Tertiary amine sulfo-succinate starch | 0.01 | 0.03 | 75 | 74 |
| Sample F | (Same as that used in Sample E) | 0.02 | 0.03 | 76 | 74 |
| Sample G | (Same as that used in Sample E) | 0.03 | 0.03 | 77 | 77 |
| Control No. 1 | Tertiary amino-alkyl ether of starch (prepared by the procedure described in Ex. 1 of U.S. 2,813,093) (D.S. of about 0.027) | — | 0.027 | 55 | 48 |
| Control No. 2 | Phosphorylated tertiary amino-alkyl ether of starch (prepared by the procedure described in Ex. 1 of U.S. 3,459,632) (D.S. of about 0.03) | — | 0.03 | 75 | 56 |
| Blank | | | | 41 | 43 |

*Based on the percent, by weight, of dry pulp.

The data summarized above clearly indicate the improved pigment retention obtained by use of the novel process of this invention. It further indicates that the extremely high percentages of pigment were consistently retained in the presence of greater amounts of alum only where the test sample additives were used.

EXAMPLE IX

This example illustrates the usefulness of thin boiling starches in the preparation of the starch paper additives of this invention.

To make each of two test sample additives, the procedural steps set forth in Example VII were repeated except a thin boiling waxy maize which had a particular water fluidity (WF) was used in each case. Each of the resulting starch derivatives had a tertiary amine group D.S. of about 0.03 and a sulfo-succinate group D.S. of about 0.03. The two test sample additives and a blank were then tested in the manner described in Part II of Example I. The WF of the waxy maizes used to prepare the additives and the pigment retention determinations are presented below.

| Material Tested | WF | % TiO$_2$ retention in the presence of following amount of alum* | |
|---|---|---|---|
| | | 4.0 | 11.0 |
| Test Sample H | 24 | 72 | 79 |
| Test Sample I | 36 | 68 | 76 |
| Blank | — | 43 | 45 |

*Based on the percent, by weight, of the dry pulp.

The data summarized above clearly indicate the improved pigment retention obtained by the use of the novel products of this invention prepared with thin boiling starch bases. It further indicates the ability of the products of this invention to consistently retain greater amounts of pigment despite a substantial increase in the amount of alum used.

EXAMPLE X

This example illustrates the usefulness of a starch derivative as a paper additive, wherein the starch base has been simultaneously converted by homolytic oxidation and etherified with aminoalkyl groups prior to esterification.

In order to make a starch derivative in the above described manner, 100 parts of corn starch were suspended in about 125 parts of tap water at about 40° C. The pH of the resulting slurry was adjusted to 11.2 by the addition of dilute sodium hydroxide. Then 3 parts of diethylaminoethylchloride HCl, 0.5 parts of calcium hydroxide, and 0.5 parts of 30% aqueous hydrogen peroxide were added to the slurry. While the pH was maintained at the aforesaid level, the mixture was agitated for about 17 hours. Thereafter the pH of the reaction mixture was adjusted to 3.0 by the addition of dilute hydrochloric acid, and the reaction product was recovered by filtration and thoroughly washed. It was determined that the converted starch base had a WF of about 7. This intermediate base was then suspended in water at a ratio of 1.0 part per 1.3 parts of water, reacted with 2.0 parts of maleic anhydride and thereafter 4.0 parts of sodium metabisulfite. The thusly prepared diethylaminoethyl, sulfo-succinate starch derivative was recovered in the manner described in Part I of Example I. This starch derivative had diethylaminoethyl group and sulfo-succinate group D.S. values of 0.03 and 0.02, respectively.

The resultant derivative, a commercially available control and a blank were tested for their pigment retention properties by the method outlined in Part II of Example I. The control consisted of a standard paper-making stock containing an aminoalkyl etherified and phosphorylated starch additive, and the blank merely consisted of the paper-making stock. The test results were as follows:

| Material Tested | %TiO$_2$ retention in presence of following amounts of alum* | |
|---|---|---|
| | 4.0 | 11.0 |
| Test Sample | 74 | 70 |
| Control | 71 | 61 |

| Material Tested | %TiO₂ retention in presence of following amounts of alum* | |
|---|---|---|
| | 4.0 | 11.0 |
| Blank | 43 | 45 |

*Based on the percent, by weight, of the dry pulp.

The data summarized above clearly indicate the improved pigment retention consistently obtained by the use of the described starch derivatives in the presence of high as well as low amounts of alum.

EXAMPLE XI

This example further illustrates the usefulness of a starch derivative as a paper additive, wherein the starch base has been simultaneously converted by oxidation and etherified with aminoalkyl groups prior to esterification.

The procedural steps of Example X were repeated, except only 0.1 parts of 30% aqueous hydrogen peroxide was used without any calcium hydroxide, and the etherification was carried out over a period of only 5.75 hours. When tested by the method described in Part II of Example I hereinabove, this diethylaminoethyl (D.S. of about 0.03) sulfo-succinate (D.S. of about 0.02) starch derivative showed pigment retention values comparable to those of the test sample in Example X.

EXAMPLE XII

This example illustrates the improved burst strength which is obtained with the use of our described additives as compared with the strength of either untreated sheets or sheets treated with a conventional diethyl-amino ethyl ether of a phosphorylated starch.

A quantity of diethyhlaminoethyl ether and sulfo-succinate derivative, having a formulation similar to that of the test sample in Example VI, was prepared according to the general procedure set forth in Part I of Example I.

With agitation, two test sample paper-making stocks, H and I, were prepared by adding a varied amount of the above described starch additives to an unbleached pulp containing 11.0 parts of alum, per 100 parts of dry pulp. The starch additive additions were made, to dilute the paper stock, at concentrations of 0.5 and 1.5 percent, respectively, based on the dry weight of the pulp. Sheets were then prepared from each of the pulp stocks on a Williams Standard Sheet Mold.

The strength of these sheets was determined using the Mullen tester according to procedures set forth in TAPPI Standards T403, ts-63. In this apparatus a sheet of paper is clamped between two ring shaped platens, thus leaving an exposed circular surface of paper under which there is an inflatable rubber diaphragm. As air is pumped into this diaphragm it expands and comes into contact with the exposed surface of the paper. Note is made of the pressure, in p.s.i., at which the diaphragm caused the paper to burst. The Mullen factor is then calculated by dividing the latter figure by the basis weight of the paper; a higher Mullen factor thus indicating a stronger paper.

Using the same paper making procedure as described above, comparable sheets were prepared with, in one case, a control comprised of the standard pulp stock having a conventional diethylamino ethyl ether of starch additive therein and, in another case, the standard pulp stock without an additive. The test results in terms of Mullen values were as follows:

| Material Tested | % Additive | Mullen | Mullen Factor |
|---|---|---|---|
| Test Sample H | 0.5 | 77.6 | 1.44 |
| Test Sample I | 1.5 | 92.3 | 1.59 |
| Control | 0.5 | 66.8 | 1.32 |
| Control | 1.5 | 76.8 | 1.45 |
| Blank | — | 60.7 | 1.12 |

The data presented above clearly show the improved bursting strength of the sheets obtained with pulp containing our additive.

Although in some cases the starch derivative containing both the cationic/cationogenic aminoalkyl ether groups and the sulfo-succinate groups and within the specified WF range is not significantly more effective at low concentrations of alum that a starch derivative which contains aminoalkyl ether groups in combination with only phosphate groups, the important factor is that the described derivative is effective as a pigment retention and strength additive in the presence of higher as well as low concentrations of alum. These improvements in the quality of the paper, particularly with regard to pigment retention, are greater than anything that could heretofore be achieved by the addition to paper pulps of corresponding amounts of other starch derivatives, or any combinations of such derivatives.

Variations may be made in proportions, procedures, and materials without departing from the scope of this invention defined by the following claims.

We claim:

1. A paper containing pigment and alum and having dispersed therein as a pigment retention aid a starch derivative of an ungelatinized starch base having a water fluidity between 4 and 40, said starch derivative containing chemically introduced sulfo-succinate groups and cationogenic or cationic nitrogen containing substituent groups selected from the group consisting of primary amine, secondary amine, tertiary amine, and quaternary ammonium groups, wherein the degree of substitution in said starch derivative is about 0.008 to 0.20 with respect to said sulfo-succinate groups and about 0.005 to 0.50 with respect to said nitrogen containing substituent groups, said paper being prepared from a papermaking stock containing more than 4% alum by weight of dry pulp and from about 0.05 to 2.0% of said starch derivative by weight of dry pulp.

2. The paper of claim 1, wherein the degree of substitution of said sulfo-succinate groups in said starch derivative is from about 0.02 to 0.06.

3. The paper of claim 1, wherein the starch base is corn starch or phosphate substituted corn starch.

4. The paper of claim 3, wherein said cationic or cationogenic nitrogen containing groups in said starch derivative are tertiary amine groups and the degree of substitution with respect to said tertiary amine groups is about 0.02 to about 0.04.

5. In a method for making paper containing pigment and alum, the step which comprises adding, as a pigment retention aid, to the stock containing more than 4% alum by weight of dry pulp, at any stage prior to forming a web, a starch derivative of an ungelatinized starch having a water fluidity between 4 and 40, said starch derivative containing chemically introduced sulfo-succinate groups and cationogenic or cationic nitrogen containing substituent groups selected from the group consisting of primary amine, secondary amine, tertiary amine, and quaternary ammonium groups, wherein the degree of substitution in said starch derivative is about 0.008 to 0.20 with respect to said sulfo-succinate groups and about 0.005 to 0.50 with respect to said nitrogen containing substituent groups, said starch derivative being added to the stock in an amount of from about 0.05 to 2.0% by weight of dry pulp.

6. The method of claim 5, wherein the degree of substitution of said sulfo-succinate groups in said starch derivative is from about 0.02 to 0.06.

7. The method of claim 5, wherein the starch base is corn starch or phosphate substituted corn starch.

8. The method of claim 7, wherein said cationic or cationogenic nitrogen containing groups in said starch derivative are quaternary ammonium groups.

9. The method of claim 7, wherein said cationic or cationogenic nitrogen containing groups in said starch derivative are tertiary amine groups and the degree of substitution with respect to said tertiary amine groups is about 0.02 to about 0.04.

* * * * *